F. WEGNER.
CONVEYING AND FEEDING MECHANISM.
APPLICATION FILED FEB. 25, 1911.
1,085,774.
Patented Feb. 3, 1914.
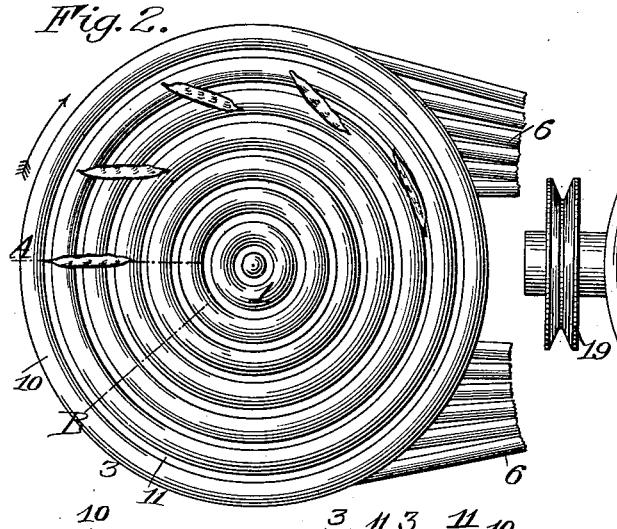
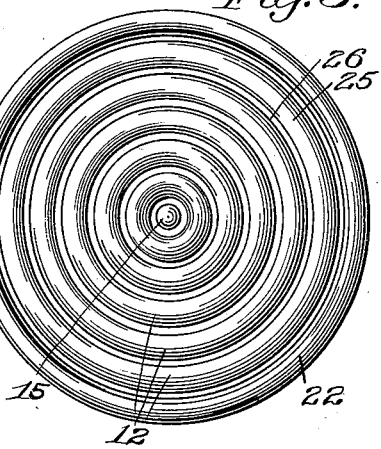
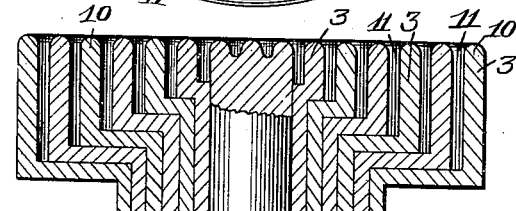
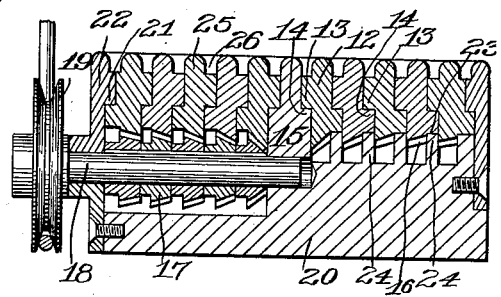
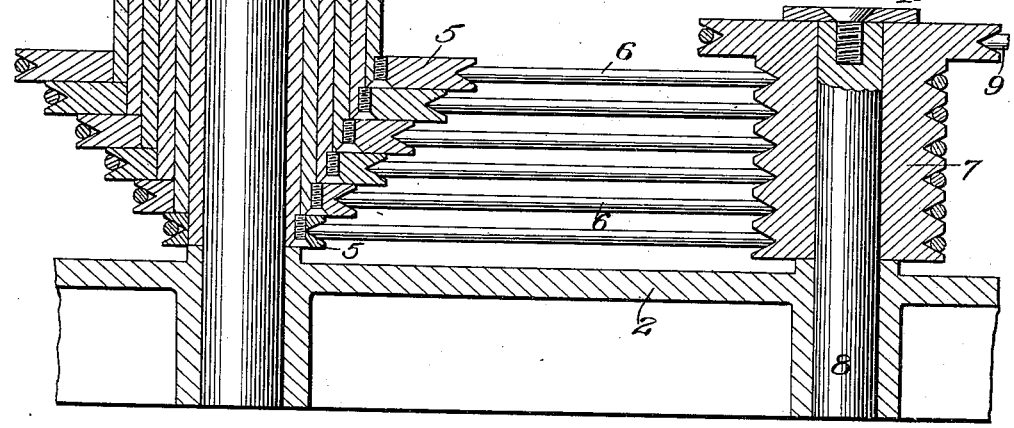
Inventor
Fred Wegner

UNITED STATES PATENT OFFICE.

FRED WEGNER, OF FAIRPORT, NEW YORK.

CONVEYING AND FEEDING MECHANISM.

1,085,774.         Specification of Letters Patent.         Patented Feb. 3, 1914.

Application filed February 25, 1911. Serial No. 610,743.

*To all whom it may concern:*

Be it known that I, FRED WEGNER, of Fairport, in the county of Monroe and State of New York, have invented certain new and useful Improvements in Conveying and Feeding Mechanism; and I do hereby declare the following to be a full, clear, and exact description of the same, reference being had to the accompanying drawings, forming a part of this specification, and to the reference-numerals marked thereon.

My present invention relates to mechanism employed for conveying or feeding articles to a machine, which is adapted to perform certain operations upon them, and it has for its special object to provide a conveyer which will transfer articles of elongated shape from a receiving point, and will present them endwise at a delivery point, regardless of the positions assumed thereby when presented to the conveyer. To these and other ends the invention consists in certain improvements and combinations of parts all as will be hereinafter more fully described, the novel features being pointed out in the claims at the end of the specification.

In the drawings:—Figure 1 is a central sectional view through a conveyer constructed in accordance with my invention, together with the driving mechanism therefor; Fig. 2 is a plan view of the conveyer; and Figs. 3 and 4 are plan and sectional views, respectively, showing a modified structure.

Similar reference numerals throughout the several figures indicate the same parts.

In performing a certain class of machine operations upon articles of various descriptions it is necessary to present them to the machine in such a direction that they will be properly received and held while the operation is being performed. If the articles are of uniform dimensions and of such a character that they will stand considerable handling, they may be arranged in parallel order in a container from which they are fed, but in case the articles are of varying size and irregular shape, or are easily damaged, it is usual to feed them to the machine by hand.

In the present invention, I provide a conveyer adapted to receive articles of elongated shape at a given point and transport them to another point where they may be removed from the conveyer, and during the movement thereof impart to the articles a turning motion which will cause them to assume positions with their longer dimension in the direction of travel before or by the time they reach the delivery point. Once an article has assumed such a direction, whether due to its initial position when presented to the conveyer or to the turning influence of the latter, its position will be unaffected during the remainder of the travel to the point of delivery.

The preferred embodiment of my invention comprises a plurality of concentric rotary conveying elements, journaled to revolve about a central arbor 1, carried by the supporting frame 2. These conveying elements are in the form of rings 3 having their upper surfaces in the same horizontal plane, the inmost ring being journaled on the arbor 1 by means of a bearing sleeve 4 and each of the successive rings having a similar sleeve, journaled on the adjacent inner sleeve. Secured to the lower ends of the sleeves 4 are pulleys 5 which are connected by belts 6 to a pulley 7 journaled on an arbor 8 on the frame 2 and driven by a belt 9 from any source of power. The pulleys 5 are preferably of different sizes, that on the inmost sleeve being the smallest and increasing in size to the one on the sleeve carrying the outmost ring. The grooves in the pulley 7 are of the same diameter, so that the pulleys 4, while being driven at the same linear velocity, have different angular velocities, the inmost pulley and therefore the inmost ring making the greatest number of revolutions in a given time. From this it will be seen that if an article be laid upon the conveyer at the point A in contact with two or more successive rings, the end thereof nearer the center of rotation will be advanced faster (with reference to a radial line) than the outer end and it will finally reach a position approximately parallel with the edges of the adjacent rings at the point where it rests. The rings 3 are of a thickness determined by the size of the article to be fed and are of such conformation as to form ridges 10 arranged in spaced relation to provide depressions 11 between them in which the articles may lie after they have been turned to coincide in direction therewith. Once an article lodges in a depression between two rings, it is unaffected by the different velocities of the latter and will be carried by them to the delivery point B without its direction being altered, at which point it may be removed from the conveyer by any suitable means.

In Figs. 3 and 4 I have shown a modified structure in which the central ring 12 is provided with an inwardly projecting annular shoulder 13, resting on a shoulder 14 on a central stud or post 15 on the support 20 and each of the successive rings is journaled on the adjacent inner ring by means of a similar inwardly projecting shoulder 13, resting on a flange 14 projecting outwardly from said inner ring. Each ring is provided with a bevel gearing 16 on its lower edge, with which engage bevel gears 17, rigidly connected to a shaft 18 journaled in the support 20 and carrying a pulley 19 by means of which power is applied thereto. The rings 11 are prevented from being raised by the lateral thrust of the gears, by means of an inwardly projecting shoulder 21 on a ring 22, secured to the support 20, said shoulder 21 engaging above the flange 14 on the outer ring. The gear teeth 16 on the rings preferably do not extend the full width thereof, but an annular bearing surface 23 is provided on each to coöperate with a similar surface on one of a series of annular projections 24 on the support 20, between which the gear teeth 16 travel. The upper surfaces of the rings are of such cross section as to form ridges 25 separated by depressions 26 as in my preferred structure. From Fig. 4 it will be seen that if power be applied to the pulley 19 the inmost ring will make the greatest number of revolutions, the speed of the rings decreasing toward the outmost one. The operation of this form of conveyer is substantially the same as in the preferred structure, therefore, a detailed description thereof is unnecessary.

The invention is especially applicable to feeding string beans to a machine for snipping the ends thereof, and in Fig. 2 such articles are shown as they are acted on by the conveyer.

I claim as my invention:

1. A conveyer comprising a plurality of rings each having a rounded upper edge and arranged concentrically with said edges in a common plane and means for driving them at different angular velocities.

2. A conveyer comprising a plurality of rings disposed concentrically each having an upper edge portion arranged in spaced relation to the adjacent rings and providing the conveyer with a surface having alternate ridges and depressions and means for driving the rings at different angular velocities.

3. A conveyer comprising a plurality of annular conveying elements, arranged to rotate in the same plane about a common center, and means for driving them at different angular velocities, the velocities of the successive elements decreasing from the center outward.

4. The combination with a plurality of annular concentric conveying elements having their upper surfaces in substantially the same plane, the element nearest the center being journaled on an arbor, and each of the outer elements being journaled on the adjacent inner elements, of driving means coöperating with each element to drive them at different angular velocities.

5. A conveyer comprising a plurality of annular elements revoluble independently about a common axis, a ridge on each of said elements, said ridges being arranged concentrically with their upper surfaces in the same plane and spaced apart to provide depressions between them.

6. In a conveyer, the combination with a support, of a plurality of conveyer rings mounted thereon to revolve about a common center, a shoulder on the support, a flange on one side of each of the rings and a shoulder on the opposite side, said shoulder on the support engaging above the flange on the adjacent ring and said ring being journaled on the next adjacent ring with its shoulder resting on the flange of said ring.

7. In a conveyer, the combination with a support, of a plurality of annular conveyer elements mounted thereon to revolve about a common center, gears on each of the elements, a shaft journaled in the support and gears on the shaft adapted to engage with the gears on the conveyer elements.

FRED WEGNER.

Witnesses:
  ORLO H. ADAMS,
  ALBERT BUSCH.